(12) United States Patent
Jones et al.

(10) Patent No.: US 11,093,889 B2
(45) Date of Patent: Aug. 17, 2021

(54) DELEGATE ITEM DELIVERY

(71) Applicant: Walmart Apollo, LLC, Bentonville, AR (US)

(72) Inventors: Matthew A. Jones, Bentonville, AR (US); Todd D. Mattingly, Bentonville, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 325 days.

(21) Appl. No.: 15/861,813

(22) Filed: Jan. 4, 2018

(65) Prior Publication Data

US 2018/0189728 A1     Jul. 5, 2018

Related U.S. Application Data

(60) Provisional application No. 62/442,010, filed on Jan. 4, 2017.

(51) Int. Cl.
| | | |
|---|---|---|
| *G06Q 10/08* | (2012.01) | |
| *H04L 29/08* | (2006.01) | |
| *G06Q 10/04* | (2012.01) | |
| *G06Q 30/02* | (2012.01) | |

(52) U.S. Cl.
CPC ......... *G06Q 10/0832* (2013.01); *G06Q 10/04* (2013.01); *G06Q 30/0222* (2013.01); *H04L 67/306* (2013.01)

(58) Field of Classification Search
CPC ............. G06Q 10/083; G06Q 10/0832; G06Q 10/0833; G06Q 10/0835; G06Q 10/0837
USPC ....................................................... 705/332
See application file for complete search history.

(56) References Cited

U.S. PATENT DOCUMENTS

| | | |
|---|---|---|
| 7,765,131 B2 | 7/2010 | Klingenberg |
| 9,195,950 B2 | 11/2015 | Schenken |
| 2004/0211834 A1 | 10/2004 | Fleckenstein |
| 2009/0326971 A1 | 12/2009 | Piccinini |
| 2011/0270714 A1 | 11/2011 | Myrick |
| 2012/0011205 A1* | 1/2012 | Paulsami ........... G06Q 10/1095 709/206 |

(Continued)

OTHER PUBLICATIONS

USPS.com, "USPS Package Intercept", ScreenGrab via WebArchive dated Jul. 8, 2016, available at: https://web.archive.org/web/20160708084252/https://retail-pi.usps.com/retailpi/actions/index.action (Year: 2016).*

(Continued)

*Primary Examiner* — Emmett K. Walsh
(74) *Attorney, Agent, or Firm* — Fitch, Even, Tabin & Flannery LLP

(57) ABSTRACT

In some embodiments, apparatuses and methods are provided herein useful to enable delivery to a delegate of a user. A calendar function of the user can be utilized to determine whether a delivery can be successfully completed. In several embodiments, a system as described herein can access wireless smart devices of the user and one or more delegates thereof to schedule a delivery of one or more products. The system analyzes locations and times of scheduled events to determine whether the user has a conflict for a delivery time and, if so, whether any of the delegates are authorized and available to receive the delivery. The system can send out notifications and/or invites based on priorities determined by the user.

28 Claims, 6 Drawing Sheets

(56) References Cited

U.S. PATENT DOCUMENTS

| | | | |
|---|---|---|---|
| 2013/0006739 A1* | 1/2013 | Horvitz | G06Q 30/06 |
| | | | 705/14.23 |
| 2013/0275326 A1 | 10/2013 | Klingenberg | |
| 2014/0038550 A1 | 2/2014 | Hwang | |
| 2014/0180959 A1* | 6/2014 | Gillen | G06Q 50/01 |
| | | | 705/341 |
| 2015/0019455 A1* | 1/2015 | Hilbush | G06Q 10/083 |
| | | | 705/337 |
| 2015/0154559 A1 | 6/2015 | Barbush | |
| 2015/0262125 A1* | 9/2015 | Sager | G06Q 10/08355 |
| | | | 705/338 |
| 2015/0294262 A1 | 10/2015 | Nelson | |
| 2016/0071051 A1* | 3/2016 | Tibbs | G06Q 10/083 |
| | | | 705/337 |
| 2017/0091699 A1* | 3/2017 | Mueller | G06Q 10/083 |
| 2017/0185961 A1* | 6/2017 | Shiryan | G06Q 10/08355 |
| 2018/0060812 A1* | 3/2018 | Robinson | G06Q 10/0836 |

OTHER PUBLICATIONS

PCT; App. No. PCT/US18/12317 ; International Search Report and Written Opinion dated Mar. 7, 2018.

* cited by examiner

DELEGATE ITEM DELIVERY

CROSS-REFERENCE TO RELATED APPLICATION

This application claims the benefit of U.S. Provisional Application No. 62/442,010 filed Jan. 4, 2017, which is incorporated herein by reference in its entirety.

TECHNICAL FIELD

This invention relates generally to delivery of items and, more particularly, to scheduling delivery of items.

BACKGROUND

While delivery provides the convenience of avoiding having to travel to a brick-and-mortar store or transport objects, scheduling the delivery can present difficulties, especially where the delivery requires a signature. In such a case, the recipient may be required to be present at the delivery location or could leave a signed authorization for the delivery person to leave the item. In the first instance, it may be difficult to schedule a time when both the delivery company and the recipient are available at the same time. In the second instance, the item may be left in an unsecured area for extended periods.

BRIEF DESCRIPTION OF THE DRAWINGS

Disclosed herein are embodiments of systems, apparatuses and methods pertaining to scheduling delivery of one or more items to a delegate of a user. This description includes drawings, wherein.

Figure 1:
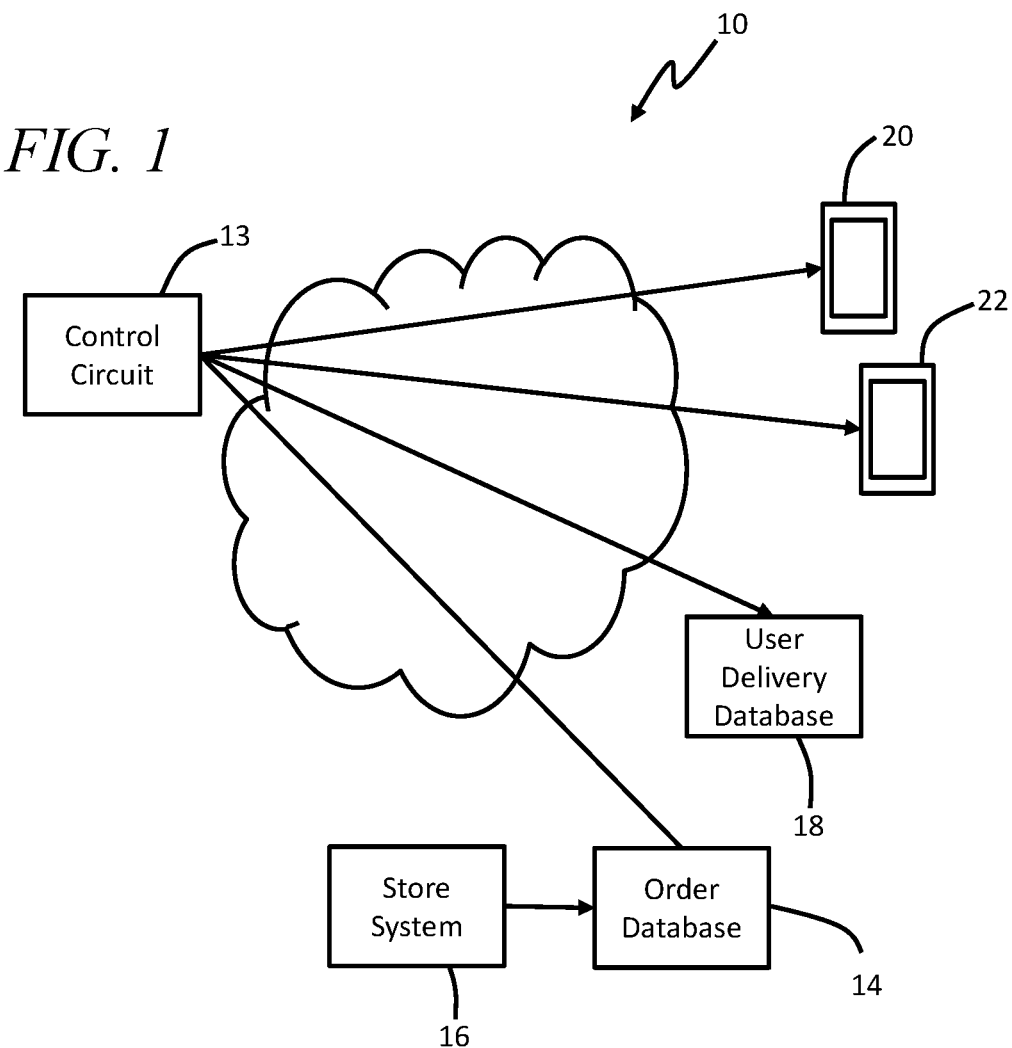
FIG. 1 is a system diagram in accordance with some embodiments.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, pursuant to various embodiments, systems, apparatuses and methods are provided herein useful to enable delivery to a delegate of a user. A calendar function of the user can be utilized to determine whether a delivery can be successfully completed. If the user has a conflict with a proposed delivery time, delivery can then be scheduled to a delegate of the user. By some approaches, delegates of the user are set in a hierarchy according to rules or levels set by the user to enable efficient selection.

In some embodiments, a system as described herein can access wireless smart devices of the user and one or more delegates thereof to schedule a delivery of one or more products. The system analyzes locations and times of scheduled events to determine whether the user has a conflict for a delivery time and, if so, whether any of the delegates are authorized and available to receive the delivery. The system can send out notifications and/or invites based on priorities determined by the user.

A delegate delivery system 10 is shown in FIGS. 1-8. The system 10 includes several components configured to interact to schedule a delivery of a product 12, ultimately, to a user. The system 10 includes a control circuit 13, such as a server or the like, in communication with an order database 14 that is configured to store data pertaining to user orders, such as data identifying the user and transaction details, including identifying the product 12. The order database 14 can receive the data from a store system 16, such as from website or brick-and-mortar-based sales. So configured, when a user completes a transaction for the product 12, the store system 16 will send the data pertaining to the user order to the delegate delivery system 10 to be stored on the order database 14 thereof. If desired, the delegate delivery system 10 and the store system 16 can a combined system or remote communicating systems as desired.

The delegate delivery system 10 can further include a user delivery database 18 configured to store user delivery data pertaining to customer delivery preferences for each customer. The user delivery data can include contact information for the user, such as an address, telephone number, email address, or other registered screen/user name. The user delivery data can further include access information allowing the system 10 to access an electronic calendar of the customer operating on a user communication device 20, described in more detail below. The user delivery data further includes delivery delegate information for one or more delegates identified or accepted by the customer that are authorized by the customer to receive delivery on behalf of the customer. For user identified delegates, the user can enter the delivery delegate information using the user device 20 or other computing device to store the information in the database 18. The delivery delegate information can include identification information for the delegates, contact information for the delegates, including one or more addresses, such as a home address, a word address, and so forth, telephone number, email address, and other registered screen/user names for the system 10. The delivery delegate information can further include access information allowing the system 10 to access an electronic calendar of the delegate operating on a delegate communication device 22, described in more detail below.

Figure 2:
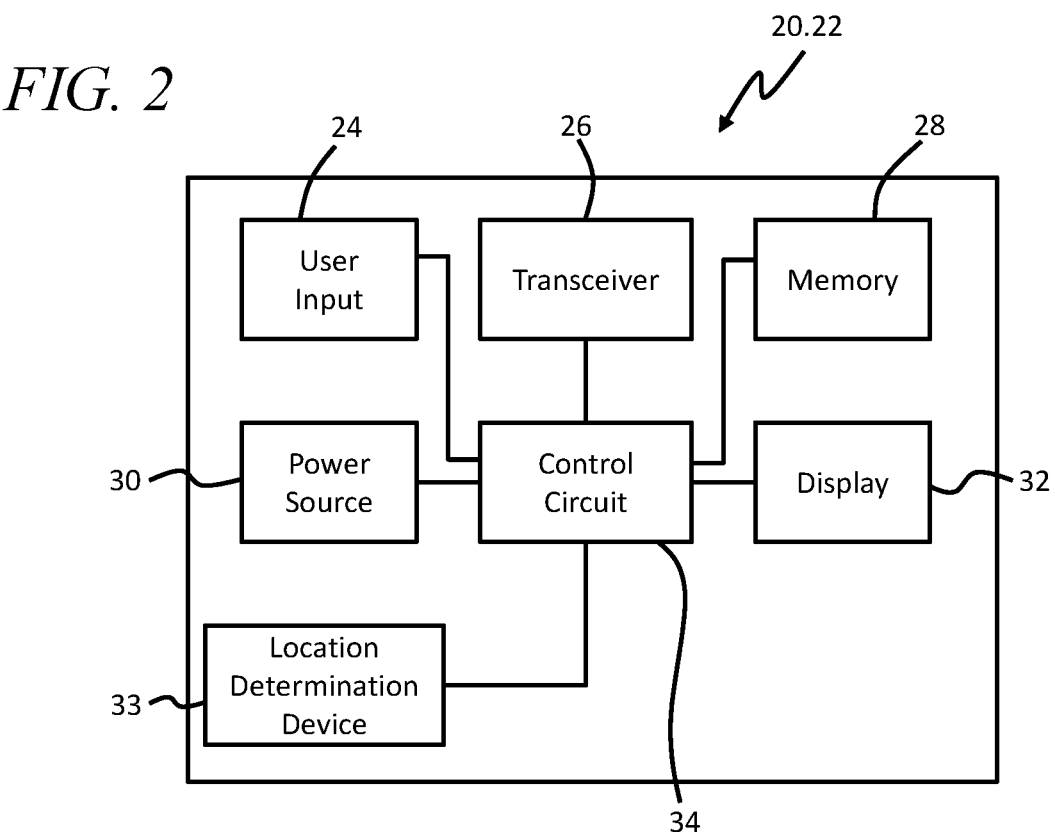
FIG. 2 is a device diagram in accordance with several embodiments.

As shown in FIG. 2, the user and delegate communication devices 20, 22 each include a user input 24, such as a touch screen, keypad, switch device, voice command software, or the like, a transceiver 26, a memory 28, a power source 30, which can be replaceable or rechargeable as desired, a display 32, location determination circuitry 33, and a control circuit 34 controlling the operation thereof. As commonly understood, the components are connected by electrical pathways, such as wires, traces, circuit boards, and the like.

The term control circuit refers broadly to any microcontroller, computer, or processor-based device with processor, memory, and programmable input/output peripherals, which is generally designed to govern the operation of other components and devices. It is further understood to include common accompanying accessory devices, including memory, transceivers for communication with other components and devices, etc. These architectural options are well known and understood in the art and require no further description here. The control circuit 11, 34 may be configured (for example, by using corresponding programming stored in a memory as will be well understood by those skilled in the art) to carry out one or more of the steps, actions, and/or functions described herein.

As discussed above, the system 10 can utilize a calendar application operating on the user and delegate devices 20, 22. The calendar application can be a dedicated calendar application or can be part of a larger application, including email, notes, tasks, or other functionalities. As commonly understood, users utilize calendar applications to set appointments, events, trips, and so forth, and enter other time commitments, such as job schedules. Advantageously, the system 10 reviews a user's calendar to determine the user's availability for particular times. Further, entries in the calendar can provide information about a user's location during particular times and can be used to extrapolate or determine travel routes for the user going to and from the entries. By another or a further approach, the system 10 utilizes the location determination circuitry 33 of the user or delegate device 20, 22 to determine a current location of the user or delegate device 20, 22. The analysis of the system 10 can include both determining a delivery location that a given delegate will be within range of, but also determining if the same delegate will be within range of the user to complete delivery. For example, the system 10 can analyze the calendar/location of a particular delegate and determine that the delegate will travel within a given distance of a delivery location at a first time and within a given distance of the customer at a second, subsequent time.

The user and delegate(s) opt in to share the calendar and location information with the system 10. By a first approach, the user and delegate devices 20, 22 can be configured to report calendar and location information to the system 10. By another approach, the user and delegates can allow the system 10 to access location information and the calendar application on the user or delegate device 20, 22 and/or a remotely stored backup thereof, such as on a third party database 36. For example, the system 10 can include a corresponding application installed and operating on the user or delegate device 20, 22 configured as commonly understood, such that the application can receive access rights and access the memory 28 and other desired applications, such as the calendar/email application, of the devices 20, 22.

Figure 3:
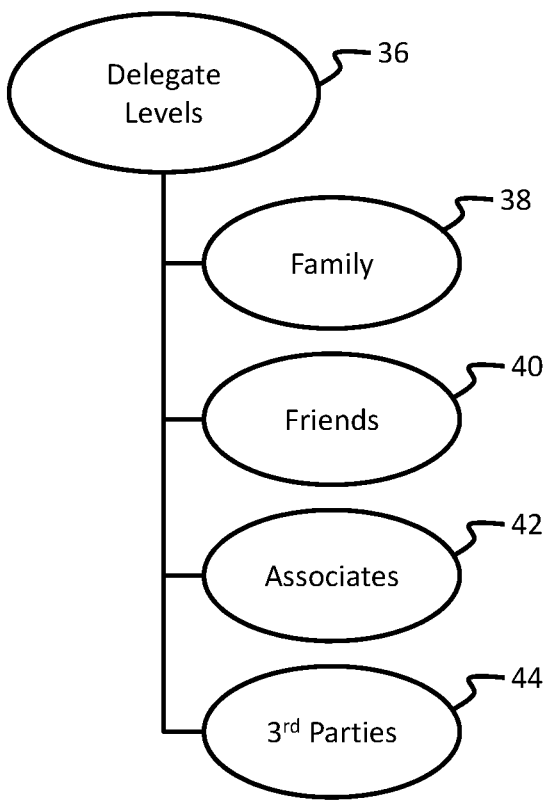
FIG. 3 is a flowchart in accordance with some embodiments.

The user can also create and store delegate levels 36 for the system 10 to review upon making a delegate selection, as shown in FIG. 3. More specifically, a user places or assigns delegates in levels based on trust. For example, a family designation 38 can indicate a full trust level to receive any products 12, a friend designation 40 can indicate a lower level of trust with associated identification of products and/or monetary values that should not be delivered to the delegates. Similar designation levels can be entered for associates 42, such as coworkers, neighbors, and so forth. A final designation level can be for third party delegates 44 not previously associated with the user. For example, advertisements or other contacts can solicit third party delegates to apply to the system 10. The third party delegates can then be vetted, including background checks, interviews, and so forth, before the system 10 recommends the third party delegates to other users of the system 10.

Figure 4:
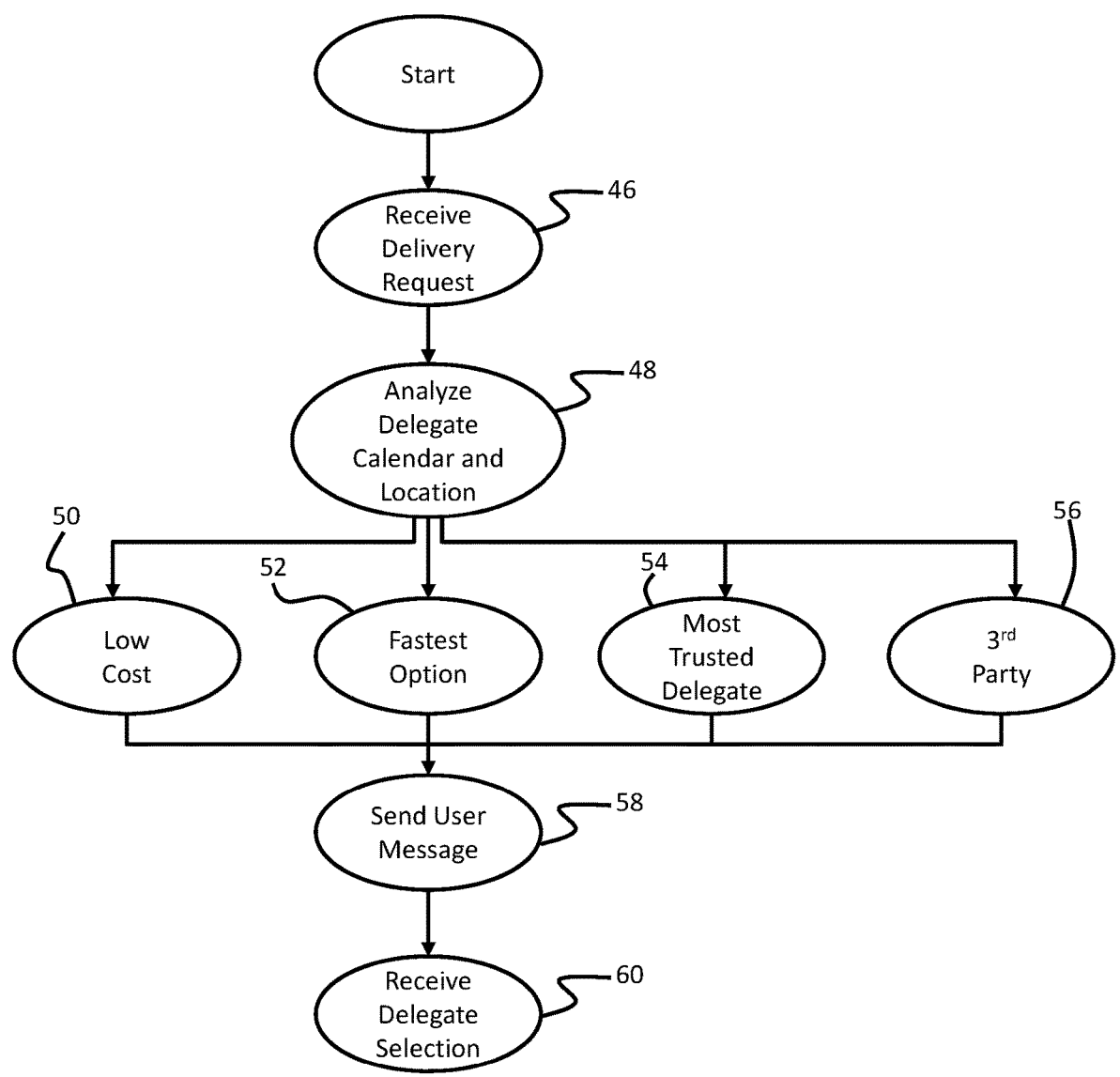
FIG. 4 is a flowchart in accordance with several embodiments.

In some embodiments and as shown in FIG. 4, the system 10 receives a delivery request 46 and analyzes the calendar and location information 48 of the delegates and makes suggestions to the user based on various results. For example, by one approach, the system 10 determines a lowest cost option 50 and sends a message 58 to the user device 20 identifying the delegate with the lowest cost option. In such a case, the selection would include a delegate and delivery location, which can be any desired location associated with the delegate, such as home, work, a public location on a route of travel or near an event of the delegate, and so forth. The system 10 can also determine a fastest delivery option 52 and send a message 58 to the user device 20 identifying the delegate that can receive the product 12 in the fastest time and a delivery location. The system 10 can also identify a most trusted delegate available for delivery option 54 based on the stored levels and send a corresponding message 58 to the user device 20 for confirmation. Additionally, the system 10 can analyze any third party delegates in the delivery area and recommend suitable third party delegates 56 to decrease delivery times, costs, and so forth. If desired, the system 10 can send a message 58 identifying one or all of the above options to allow the user to select a desired option using the user input 24. By a further approach, the message from the system 10 can include delivery window options and the user can select a desired delivery window instead of a specific delegate. Finally, the system 10 can request and receive a selection of one or the delegate options 60 from the user.

Figure 5:
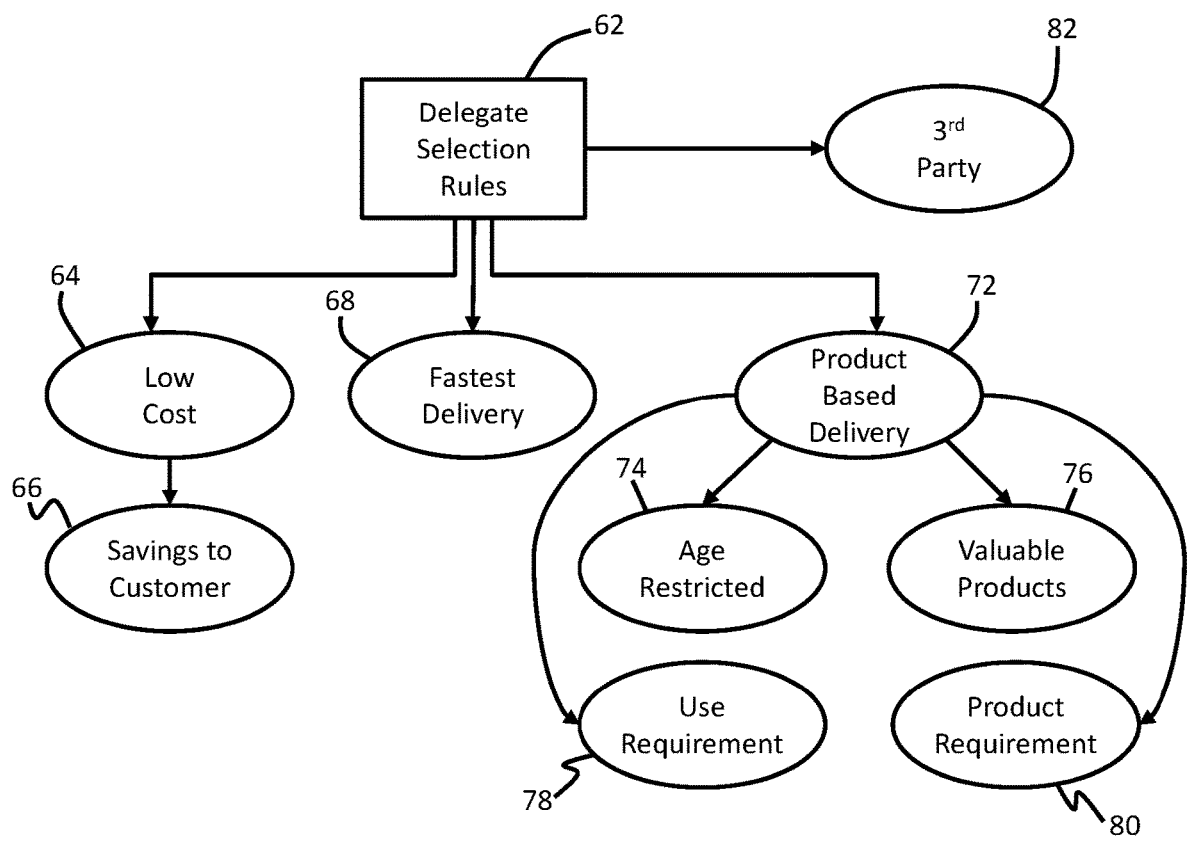
FIG. 5 is a flowchart in accordance with some embodiments.

In some forms and as shown in FIG. 5, the user further creates and stores delegate selection rules 62 that direct the system 10 during the delegate selection process. By one approach, the delegate can be selected based on a cost 64 of the delivery. Various inputs can be determine a cost of a delivery, including delivery location, delivery distance, storage time, and so forth. If desired, the system 10 can prioritize cost savings by passing some or all of the savings 66 of a particular delegate selection onto the user. The savings can be incorporated into the initial order by modifying the order, sent as a refund, credited to a next order, and so forth. By another approach, the delegate can be selected based on the fastest delivery option 68. For example, some delegates can be associated with slower delivery times, while others can be associated with fast delivery times. By yet another approach, the delegate can be selected based on the products 12 ordered 72. For example, delegates can be identified as qualified to receive particular items, such as age-restricted products 74 or sensitive items, i.e., tobacco, alcohol, prescription medication, and so forth. In another example, the user identifies delegates eligible to receive valuable products 76 over a predetermined price threshold, within a price range, or lower than a predetermined price. By a further approach, the delegate can be selected based on a requirement 80 or use 76 of the product 12. For example, the product 12 may be perishable or may be for a specific event. Further, the system 10 can utilize the order type to extrapolate what the user needs the item(s) for and identify a delegate and delivery to fulfill that need. If the product 12 is perishable, the system 10 can determine whether the product 12 can be delivered to a location of the user, such as a home or office, that will provide adequate storage or whether the product 12 can be stored at a different location for pick-up by the user or a delegate thereof with adequate storage. If the product is food, the system 10 can identify the delivery locations, e.g., home, work, travel location, to determine an optimal time for delivery and analyze the available delegates to accommodate the optimal delivery. For a recreational product 12, the system 10 can analyze the delivery destination and the calendar of the user to determine an optimal delivery time. For example, the system 10 can determine whether the product 12 can be picked up or purchased at a store by one of the delegates of the user and delivered to the destination by a needed time, e.g., a game time, a closing time of the park, gym, venue, etc. Finally, for certain levels, such as $3^{rd}$ party delegates 82 and/or associates, the system 10 can be configured to require selection by the user so that the user provides explicit consent for the delivery.

Figure 6:
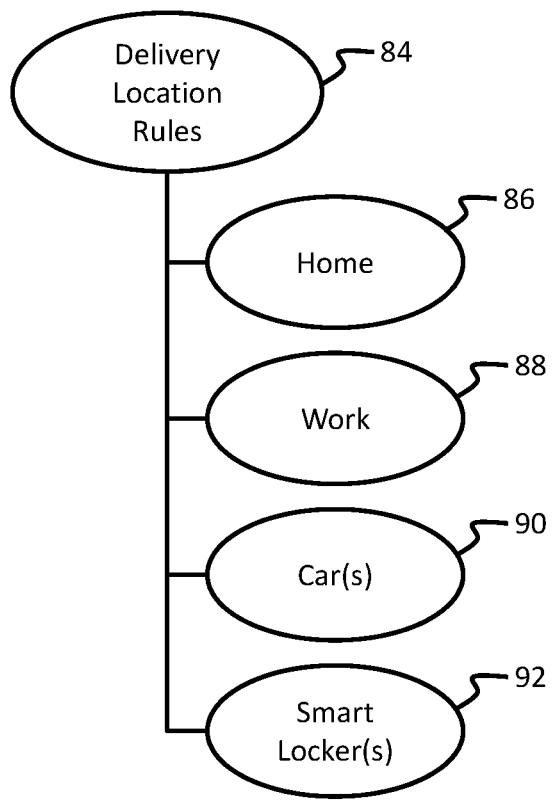
FIG. 6 is a flowchart in accordance with several embodiments.

The user can also set and store delivery location rules 84, as shown in FIG. 6. For example, the user can have several delivery locations stored in the system 10, such as home 86, work 88, one or more cars 90, and one or more smart lockers 92 at various locations, such as at one of the previous locations, along a travel route, at a location retail location, or the like. In some forms, the user sets priorities for each delivery location for the system 10 to analyze while setting a delivery method. If desired, the user provides the system 10 with access codes or access rights data to operate devices at the home, car, and/or smart locker. The access codes/rights can be entered at a keypad or other user input at the devices or can be utilized by a smart device of the delegate or other delivery person to send a signal to the devices. By a first approach, when requesting delivery of the product 12, the system 10 analyzes the priorities of the delivery locations and the availabilities of the user or, if necessary, the delegates, to set a delivery method. By a second approach, when requesting delivery of the product 12, the user chooses the delivery location, selecting from the options. The user is further provided with the option of utilizing delegates for delivery.

Figure 7:
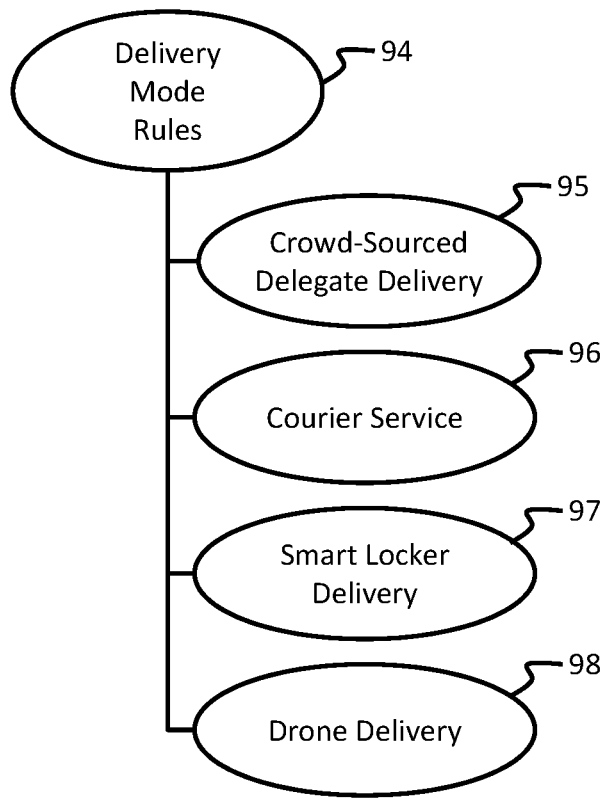
FIG. 7 is a flowchart in accordance with some embodiments.
Figure 8:
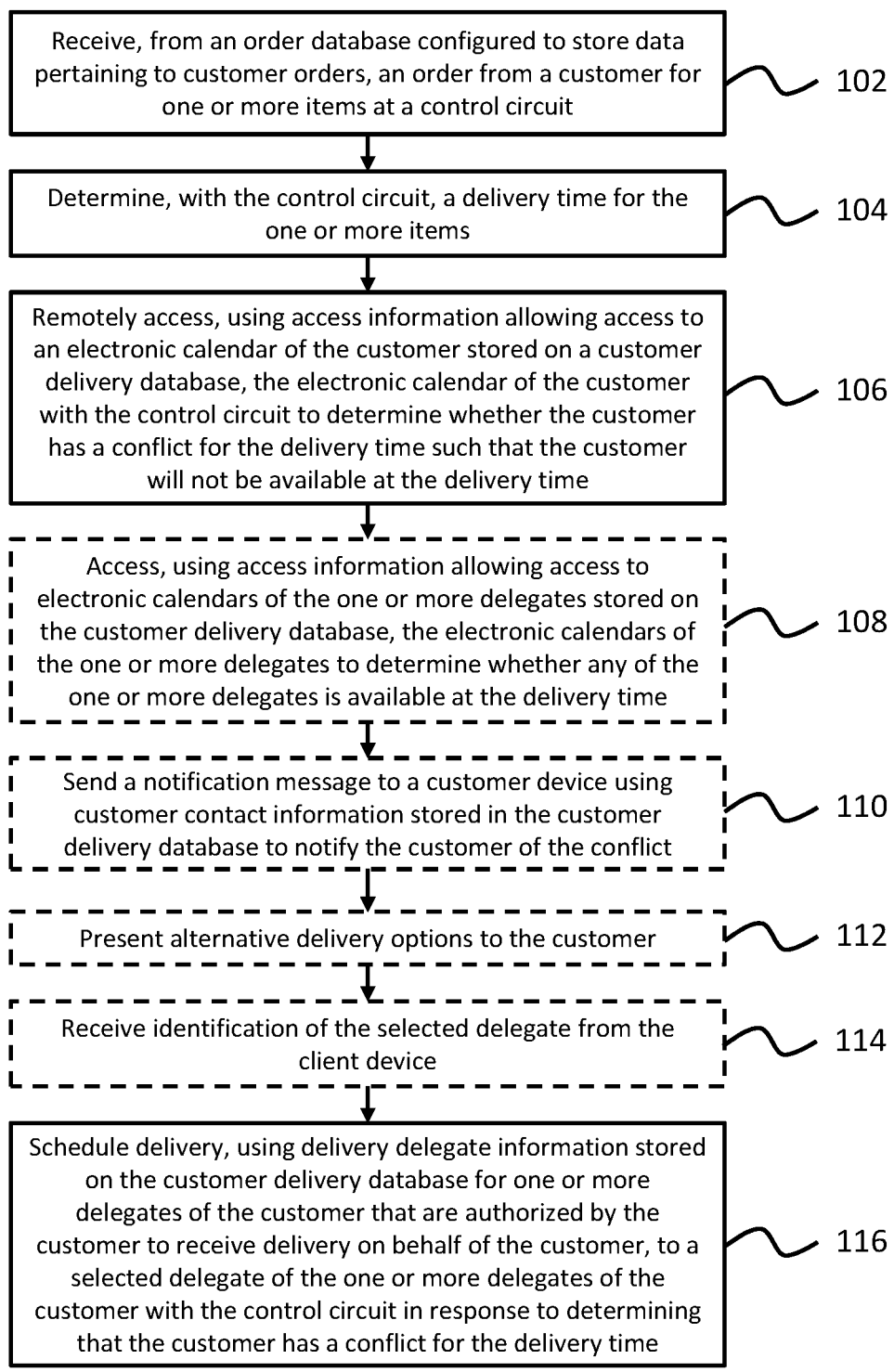
FIG. 8 is a flowchart in accordance with several embodiments.

The user can also set delivery mode rules 94 identifying priorities for various delivery modes, as shown in FIG. 7. By some approaches, the delivery modes include crowd-sourced delegate delivery 95, a courier service 96, smart locker delivery 97, and drone delivery 98, for example.

So configured, in some embodiments, after the user orders a product 12, the store system 16 will contact or utilize the delegate delivery system 10 to schedule a delivery of the product 12. The system 10 determines one or more open delivery times for the system 10 to schedule the delivery of the product 12. Thereafter, the system 10 then accesses the calendar application of the user device 20 or receives information therefrom to determine whether the user is available for the one or more open delivery times. If the user is unavailable due to a conflict, the system 10 sends a message to the user device 20 to notify the user of the conflict.

The system 10 also determines whether one of the delegates is available at the open delivery times to receive delivery of the product 12. If desired, the system 10 can automatically analyze the products 12 and delegates using the levels and selection rules and present one or more delegates as delivery options to the user in the conflict message. Alternatively, the system 10 can send a second message to the user device 20 to request selection of a desired delegate from the user. Thereafter, the user can operate the user input 24 to select a desired delegate to receive the products 12. By another approach, the system 10 can automatically analyze the stored levels and selection rules to determine a selected delegate without additional input from the user.

After a delegate is selected, the system 10 then sends a notification message to the delegate device 22 of the selected delegate and requests acceptance of the delivery. To accept the delivery, the delegate sends a confirmation message to the system 10 using the user input 24. The system 10 can further send an invite to the selected delegate to add a delivery event to the delegate's calendar and send a notification message to the user device 20 to inform the user of the confirmation. The messages as described herein can utilize banner messages, push notification messages, and the like to efficiently notify the users and delegates, and receive input therefrom. By a further approach, the system 10 can be configured to direct delivery to a delegate if a scheduled delivery to the user fails for any reason following any of the above options. Thereafter, the system 10 the coordinates with delivery units, or third party delivery companies, to schedule and deliver the products 12 to the user or selected delegate.

In some configurations, the system 10 is configured to verify or check the location of the user communication device 20 and/or the delegate communication device 22. By one approach, this occurs via the location determination circuitry 33, which may include, for example, GPS, cellular and/or Wi-Fi systems that can be used to determine a current device location. Further, the current device location may be compared with other location information, such as, for example, the location information found in the calendar application operating on the user and delegate communication devices 20, 22. In this manner, if the user or delegate has a last-minute change to their schedule, the system 10 may accommodate the change, even though the location information of the calendar application has not been updated.

Furthermore, by having the system 10 check the location of one or more devices 20, 22 via location services (apart from the calendar application), the system 10 incorporates an added a level of security. In this manner, the system 10 can confirm that the current location of a delegate communication device 22 matches the calendared, expected location to ensure that the delegate is located at or near a specific location set in their calendar where they are scheduled to receive a delivery as a delegate. In addition to flagging potential fraud situations, this also may permit the user to set location-specific rules for delegates. For example, a specific delegate may only be able to accept delivery of a specific class of goods if the delegate is at a certain address. The location-specific rules or permissions may be particularly useful for certain goods, such as those which are large, fragile, have a short shelf life, etc.

In yet another approach, the verified current device location also may be employed to audit the system 10 and deliveries of goods. For example, if a package or delivery is lost, the system 10 may confirm the location of the delegate communication device 22 at the time of delivery to assist with delivery recovery.

In operation, once the control circuit receives current device location information from a delegate or customer device 20, 22, the control circuit may compare the current device location with the expected, calendared location of the associated device to identify or flag devices that are outside of the expected location range according to the device's associated electronic calendar. Further, once a delegate communication device 22 is flagged as being outside of the range expected for the device according to the associated calendar, the control circuit may audit the device 22 and/or initiate an alternative delivery of the order that was previously routed for delivery to the delegate associated with that particular communication device 22. Thus, if a particular delegate needs to be at home to receive a particular delivery, and the device 22 associated with that delegate is not in located at the user's home according to the device's location determination circuitry 33, the control circuit may, for example, identify another delegate for delivery pursuant to the levels and selection rules in the customer delivery database and/or send an alert or message to the user so that the user may select an alternative delivery plan.

In some embodiments, a system for delivery to a delegate of a customer is described herein that includes an order database configured to store data pertaining to customer orders; a customer delivery database configured to store data pertaining to customer delivery preferences for each customer including access information allowing access to an electronic calendar of the customer and delivery delegate information for one or more delegates of the customer that are authorized by the customer to receive delivery on behalf of the customer; and a control circuit configured to access the order database and the customer delivery database. The control circuit is configured to: receive, from the order database, an order from a customer for one or more items; determine a delivery time for the one or more items; remotely access, using the access information from the customer delivery database, an electronic calendar of the customer to determine whether the customer has a conflict for the delivery time such that the customer will not be available at the delivery time; and schedule delivery, using the delivery delegate information from the customer delivery database, to a selected one of the one or more delegates of the customer in response to determining that the customer has a conflict for the delivery time.

By several approaches, the customer delivery database can include customer contact information; and the control circuit can be configured to send a notification message to a customer device to notify the customer of the conflict and present alternative delivery options to the customer using the customer contact information. By further approaches, the notification message can include a plurality of delivery options delivering the one or more items to one of the one or more delegates at one or more delivery locations.

By some approaches, the control circuit can be configured to analyze the delivery delegate information and recommend a delegate of the one or more delegates to optimize a cost of the delivery of the one or more items. By other approaches, the control circuit can be configured to analyze the delivery delegate information and recommend a delegate of the one or more delegates to optimize a speed of the delivery of the one or more items.

By several approaches, the control circuit can be configured to analyze the one or more items and recommend a delivery option based on a use requirement of the one or more items.

By some approaches, the delivery delegate information stored on the customer delivery database can include access information allowing access to electronic calendars of the one or more delegates; and the control circuit can be configured to remotely access, using the access information from the customer delivery database, the electronic calendars of the one or more delegates to determine whether any of the one or more delegates is available at the delivery time.

By further approaches, the control circuit can be further configured to analyze events in the customer and delegate calendars to determine traveling locations for the events; and determine whether the traveling locations bring the customer or delegates close to a delivery location for the one or more items.

By several approaches, the customer delivery database can include delegate contact information; and the control circuit can be configured to: send a notification message to a delegate device of the selected delegate using the delivery delegate information from the customer delivery database, and receive a confirmation message from the delegate device.

By some approaches, the control circuit can be configured to receive levels for each of the one or more delegates specified by the customer and store the levels in the customer delivery database. By further approaches, the control circuit can be configured to receive delegate selection rules specified by the customer; and store the delegate selection rules in the customer delivery database.

In several embodiments, a method 100 for delivery to a delegate of a customer is described herein that includes: receiving 102, from an order database configured to store data pertaining to customer orders, an order from a customer for one or more items at a control circuit; determining 104, with the control circuit, a delivery time for the one or more items; remotely accessing 106, using access information allowing access to an electronic calendar of the customer stored on a customer delivery database, the electronic calendar of the customer with the control circuit to determine whether the customer has a conflict for the delivery time such that the customer will not be available at the delivery time; and scheduling 116 delivery, using delivery delegate information stored on the customer delivery database for one or more delegates of the customer that are authorized by the customer to receive delivery on behalf of the customer, to a selected delegate of the one or more delegates of the customer with the control circuit in response to determining that the customer has a conflict for the delivery time.

By some approaches, the method 100 further includes: sending 110 a notification message to a customer device using customer contact information stored in the customer delivery database to notify the customer of the conflict; and presenting 112 alternative delivery options to the customer.

By several approaches, sending the notification message comprises sending a notification message with a plurality of delivery options delivering the one or more items to one of the one or more delegates at one or more delivery locations.

By some approaches, the method 100 can include: analyzing the delivery delegate information; and recommending a delegate of the one or more delegates to optimize a cost of the delivery of the one or more items. By further approaches, the method 100 can include: analyzing the delivery delegate information; and recommending a delegate of the one or more delegates to optimize a speed of the delivery of the one or more items.

By several approaches, the method 100 can include: analyzing the one or more items; and recommending a delivery option based on a use requirement of the one or more items.

By some approaches, the method 100 can include receiving 114 identification of the selected delegate from the client device.

By several approaches, the method 100 can include accessing 108, using access information allowing access to electronic calendars of the one or more delegates stored on the customer delivery database, the electronic calendars of the one or more delegates to determine whether any of the one or more delegates is available at the delivery time. By further approaches, the method 100 can include: analyzing events in the customer and delegate calendars to determine traveling locations for the events; and determining whether the traveling locations bring the customer or delegates close to a delivery location for the one or more items.

By some approaches, the method 100 can include: Sending, using the delivery delegate information, a notification message to a delegate device of the selected delegate; and receiving a confirmation message from the delegate device.

By several approaches, the method 100 can include: receiving levels for each of the one or more delegates specified by the customer; and storing the levels for each of the one or more delegates in the customer delivery database. By further approaches, the method 100 can include: receiving delegate selection rules specified by the customer; and storing the delegate selection rules in the customer delivery database.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

What is claimed is:

1. A system for delivery to a delegate of a customer, the system comprising:
   an order database configured to store data pertaining to customer orders;
   a customer delivery database includes customer contact information and is configured to store data pertaining to customer delivery preferences for each customer including access information allowing access to an electronic calendar of the customer and delivery delegate information for one or more delegates of the customer that are authorized by the customer to receive delivery on behalf of the customer; and
   a control circuit configured to access the order database and the customer delivery database, the control circuit configured to:
      receive, from the order database, an order from a customer for one or more items;
      determine a delivery time for the one or more items by remotely accessing, via the access information from the customer delivery database, the electronic calendar of the customer to determine an available delivery time when the customer is expected to be at a shipping location;
      schedule delivery to the customer at the shipping location at the available delivery time;
      receive current device location information from an electronic user device associated with the customer, compare the current device location received with a calendared location from the electronic calendar associated with the customer and the shipping location, and identify when the electronic user device is outside of an expected location range derived from the electronic calendar of the customer;
      upon a determination that the customer electronic user device is scheduled to receive delivery of the one or more items at the available delivery time while outside of the expected location, send a notification to the electronic user device to notify the customer of a developing conflict and present alternative delivery options to the customer;
      initiate an alternative delivery process for the order, using the delivery delegate information from the customer delivery database, to a selected one of the one or more delegates of the customer, in response to determining that the customer is outside of the expected location range and notify the customer via the electronic user device associated therewith;
      determine the selected one of the one or more delegates of the customer based on delegate selection rules comprising cost, speed of delivery, a trust level associated with the selected one, and third party association of the selected one; and
      transmit a notification message to a delegate electronic device associated with the selected one in response to the initiation of the alternative delivery process for the order such that the delegate electronic device displays at least one of a banner message and a push notification to instruct the selected one to respond to indicate acceptance of the delivery of the one or more items.

2. The system of claim 1, wherein the control circuit is further configured to receive a delegate selection from the electronic user device associated with the customer after the determination that the electronic user device is outside of the expected location range, which is generated, in part, based on the shipping location and the electronic calendar of the customer.

3. The system of claim 1, wherein the notification to the electronic user device includes a plurality of delivery options delivering the one or more items to one of the one or more delegates at one or more delivery locations.

4. The system of claim 3, wherein the control circuit is configured to analyze the delivery delegate information and recommend a delegate of the one or more delegates to optimize a cost of the delivery of the one or more items.

5. The system of claim 4, wherein the control circuit is configured to modify the order to pass delivery savings onto the customer.

6. The system of claim 3, wherein the control circuit is configured to analyze the delivery delegate information and recommend a delegate of the one or more delegates to optimize a speed of the delivery of the one or more items.

7. The system of claim 3, wherein the control circuit is configured to recommend a third party vetted delegate.

8. The system of claim 3, wherein the control circuit is configured to analyze the one or more items and recommend a delivery option based on a use requirement of the one or more items.

9. The system of claim 1, wherein the delivery delegate information stored on the customer delivery database includes access information allowing access to electronic calendars of the one or more delegates; and the control circuit is configured to remotely access, using the access information from the customer delivery database, the electronic calendars of the one or more delegates to determine whether any of the one or more delegates is available at the delivery time.

10. The system of claim 9, wherein the control circuit is further configured to analyze events in the customer and delegate calendars to determine traveling locations for the events; and determine whether the traveling locations bring the customer or delegates close to a delivery location for the one or more items.

11. The system of claim 1, wherein the customer delivery database includes delegate contact information; and the control circuit is further configured to:

receive a confirmation message from the delegate electronic device indicating acceptance of the delivery of the one or more items via a user input of the delegate electronic device.

12. The system of claim 1, wherein the control circuit is further configured to receive a particular trust level assigned to each of the one or more delegates specified by the customer and store the particular trust level in the customer delivery database.

13. The system of claim 1, wherein the control circuit is further configured to receive the delegate selection rules specified by the customer; and store the delegate selection rules in the customer delivery database.

14. The system of claim 1, wherein the selected one of the one or more delegates of the customer is determined by the control circuit without input from the customer.

15. A method for delivery to a delegate of a customer, the method comprising:
receiving, from an order database configured to store data pertaining to customer orders, an order from a customer for one or more items at a control circuit;
determining, with the control circuit, a delivery time for the one or more items by remotely accessing, via the access information allowing access to an electronic calendar of the customer stored on a customer delivery database, the electronic calendar of the customer with the control circuit to determine an available delivery time when the customer is expected to be at a shipping location;
scheduling, by the control circuit, delivery to the customer at the shipping location at the available time;
receiving, at the control circuit, current device location information from an electronic user device associated with the customer, comparing the current device location received with a calendared location from the electronic calendar associated with the customer and the shipping location, and identifying when the electronic user device is outside of an expected location range derived from the electronic calendar of the customer;
upon a determination that the electronic user device is scheduled to receive delivery of the one or more items at the available delivery time while outside of the expected location, sending, by the control circuit, a notification to the electronic user device to notify the customer of a developing conflict and presenting alternative delivery options to the customer;
initiating, by the control circuit, an alternative delivery process for the order, using the delivery delegate information from the customer delivery database, to a selected one of the one or more delegates of the customer, in response to determining that the customer is outside of the expected location range and notifying the customer via the electronic user device associated therewith;
determining, by the control circuit, the selected one of the one or more delegates of the customer based on delegate selection rules comprising cost, speed of delivery, a trust level associated with the selected one, and third party association of the selected one; and
transmitting, by the control circuit, a notification message to a delegate device associated with the selected one in response to the initiation of the alternative delivery process for the order such that the delegate electronic device displays to display at least one of a banner message and a push notification to instruct the selected one to respond to indicate acceptance of the delivery of the one or more items.

16. The method of claim 15, further comprising:
receiving a delegate selection from the electronic user device associated with the customer after the determination that the electronic user device is outside of the expected location, which is generated based on the shipping location.

17. The method of claim 16, wherein sending the notification to the electronic user device comprises a message indicating a plurality of delivery options delivering the one or more items to one of the one or more delegates at one or more delivery locations.

18. The method of claim 17, further comprising:
analyzing the delivery delegate information; and
recommending a delegate of the one or more delegates to optimize the cost of the delivery of the one or more items.

19. The method of claim 18, further comprising modifying the order to pass delivery savings onto the customer.

20. The method of claim 17, further comprising:
analyzing the delivery delegate information; and
recommending a delegate of the one or more delegates to optimize the speed of the delivery of the one or more items.

21. The method of claim 17, further comprising recommending a third party vetted delegate.

22. The method of claim 17, further comprising:
analyzing the one or more items; and
recommending a delivery option based on a use requirement of the one or more items.

23. The method of claim 15, further comprising accessing, using access information allowing access to electronic calendars of the one or more delegates stored on the customer delivery database, the electronic calendars of the one or more delegates to determine whether any of the one or more delegates is available at the delivery time.

24. The method of claim 23, further comprising:
analyzing events in the customer and delegate calendars to determine traveling locations for the events; and
determining whether the traveling locations bring the customer or delegates close to a delivery location for the one or more items.

25. The method of claim 15, further comprising:
receiving a confirmation message from the delegate electronic device indicating acceptance of the delivery of the one or more items via a user input of the delegate device.

26. The method of claim 15, further comprising:
receiving levels for each of the one or more delegates specified by the customer; and
storing the levels for each of the one or more delegates in the customer delivery database.

27. The method of claim 15, further comprising:
receiving the delegate selection rules specified by the customer; and
storing the delegate selection rules in the customer delivery database.

28. The method of claim 15, wherein the selected one of the one or more delegates of the customer is determined by the control circuit without input from the customer.

* * * * *

UNITED STATES PATENT AND TRADEMARK OFFICE
CERTIFICATE OF CORRECTION

PATENT NO. : 11,093,889 B2  
APPLICATION NO. : 15/861813  
DATED : August 17, 2021  
INVENTOR(S) : Matthew A. Jones and Todd D. Mattingly It is certified that error appears in the above-identified patent and that said Letters Patent is hereby corrected as shown below:

In the Claims

Claim 15, Column 12, Line 1, after "displays", delete "to display", therefor.

Signed and Sealed this  
Fourth Day of January, 2022

Drew Hirshfeld  
*Performing the Functions and Duties of the*  
*Under Secretary of Commerce for Intellectual Property and*  
*Director of the United States Patent and Trademark Office*